(12) United States Patent
Vos

(10) Patent No.: US 10,225,829 B2
(45) Date of Patent: Mar. 5, 2019

(54) METHOD AND SYSTEM FOR TRANSMITTING CONTROL INFORMATION FOR USER EQUIPMENT

(71) Applicant: SIERRA WIRELESS, INC., Richmond (CA)

(72) Inventor: Gustav Gerald Vos, Surrey (CA)

(73) Assignee: SIERRA WIRELESS, INC., Richmond, BC (CA)

(*) Notice: Subject to any disclaimer, the term of this patent is extended or adjusted under 35 U.S.C. 154(b) by 236 days.

(21) Appl. No.: 15/276,053

(22) Filed: Sep. 26, 2016

(65) Prior Publication Data

US 2017/0094644 A1 Mar. 30, 2017

Related U.S. Application Data

(60) Provisional application No. 62/232,330, filed on Sep. 24, 2015.

(51) Int. Cl.
*H04W 4/00* (2018.01)
*H04W 72/04* (2009.01)
*H04L 1/18* (2006.01)

(52) U.S. Cl.
CPC ......... *H04W 72/042* (2013.01); *H04L 1/1822* (2013.01); *H04L 1/1812* (2013.01); *H04L 1/1896* (2013.01)

(58) Field of Classification Search
CPC .. H04W 72/042; H04L 1/1822; H04L 1/1812; H04L 1/1896
See application file for complete search history.

(56) References Cited

U.S. PATENT DOCUMENTS

| | | | | |
|---|---|---|---|---|
| 9,907,062 B2 * | 2/2018 | McBeath | ............ | H04W 72/042 |
| 9,912,504 B2 * | 3/2018 | Krzymien | ........... | H04L 27/2601 |
| 2009/0307554 A1 * | 12/2009 | Marinier | ............... | H04L 1/1812 714/748 |
| 2010/0064061 A1 * | 3/2010 | Warren | ................. | G06F 3/0416 710/5 |
| 2010/0098006 A1 * | 4/2010 | Golitschek Edler Von Elbwart | ................ | H04L 1/1854 370/329 |
| 2010/0251054 A1 * | 9/2010 | Cai | ........................ | H04L 1/1877 714/748 |
| 2010/0260130 A1 * | 10/2010 | Earnshaw | ............. | H04L 1/1812 370/329 |
| 2010/0281486 A1 * | 11/2010 | Lu | ..................... | H04W 72/1247 718/104 |

(Continued)

FOREIGN PATENT DOCUMENTS

WO 2010039738 A2 4/2010
WO 2017049413 A1 3/2017

OTHER PUBLICATIONS

ISR and Written Opinion of WO 2017049413.

(Continued)

*Primary Examiner* — Stephen M D Agosta
(74) *Attorney, Agent, or Firm* — Mintz Levin Cohn Ferris Glovsky and Popeo, P.C.

(57) ABSTRACT

The present invention provides a method and system for transmitting LTE control information for Category M User Equipment (UE). According to embodiments, there is provided a method and system for LTE downlink control information for HD-FDD UE using multiple HARQ processes in a low Signal to Interference and Noise Ratio (SINR).

12 Claims, 5 Drawing Sheets

(56) References Cited

U.S. PATENT DOCUMENTS

| | | | |
|---|---|---|---|
| 2011/0122825 A1* | 5/2011 | Lee, II | H04J 11/0069 370/328 |
| 2011/0243039 A1* | 10/2011 | Papasakellariou | H04L 1/1861 370/280 |
| 2012/0033650 A1* | 2/2012 | Ahn | H04L 5/0053 370/336 |
| 2012/0195267 A1 | 8/2012 | Dai et al. | |
| 2013/0235812 A1 | 9/2013 | Heo et al. | |
| 2014/0269452 A1* | 9/2014 | Papasakellariou | H04B 7/2643 370/280 |
| 2014/0293893 A1* | 10/2014 | Papasakellariou | H04W 72/04 370/329 |
| 2014/0321418 A1* | 10/2014 | Rinne | H04L 1/1822 370/329 |
| 2015/0098370 A1* | 4/2015 | Lee | H04L 1/1671 370/280 |
| 2015/0098418 A1* | 4/2015 | Vajapeyam | H04W 4/70 370/329 |
| 2015/0200751 A1* | 7/2015 | Yin | H04L 1/1887 370/280 |
| 2015/0264678 A1* | 9/2015 | Yin | H04W 52/22 370/329 |
| 2015/0305003 A1* | 10/2015 | Chen | H04L 1/1822 370/330 |
| 2016/0095133 A1* | 3/2016 | Hwang | H04L 1/00 370/329 |

OTHER PUBLICATIONS

3GPP TS 36.212 V12.5.0 (Jun. 2015).
R1-154489—3GPP TSG RAN WG1 Meeting #82, Aug. 24-28, 2015.
R1-152301—3GPP TSG RAN WG1 Meeting #80bis, Belgrade, Serbia, Apr. 20-24, 2015.
R1-153494—3GPP TSG-RAN WG1 Meeting 81, Fukuoka, May 25-29, 2015.
R1-152615—3GPP TSG RAN WG1 Meeting #81, Fukuoka, Japan, May 25-29, 2015.
R1-153083—3GPP TSG-RAN WG1 Meeting #81, Fukuoka, Japan, May 25-29, 2015.

* cited by examiner

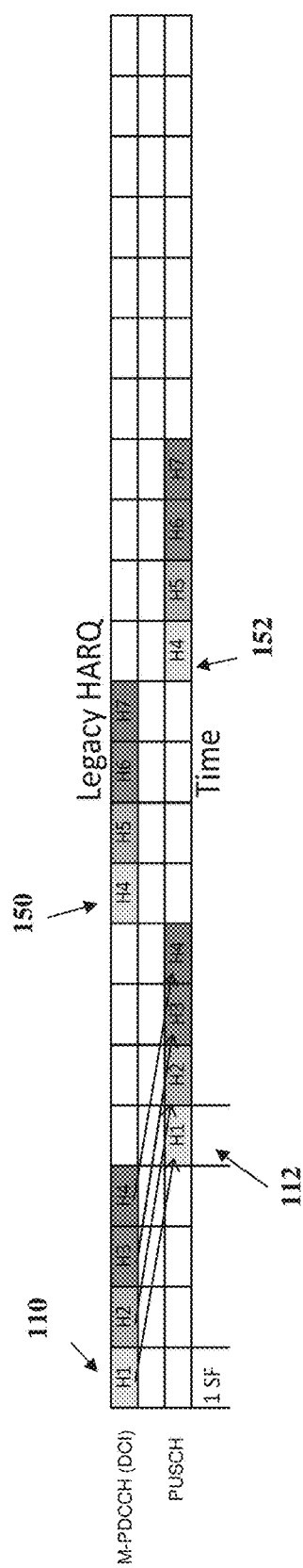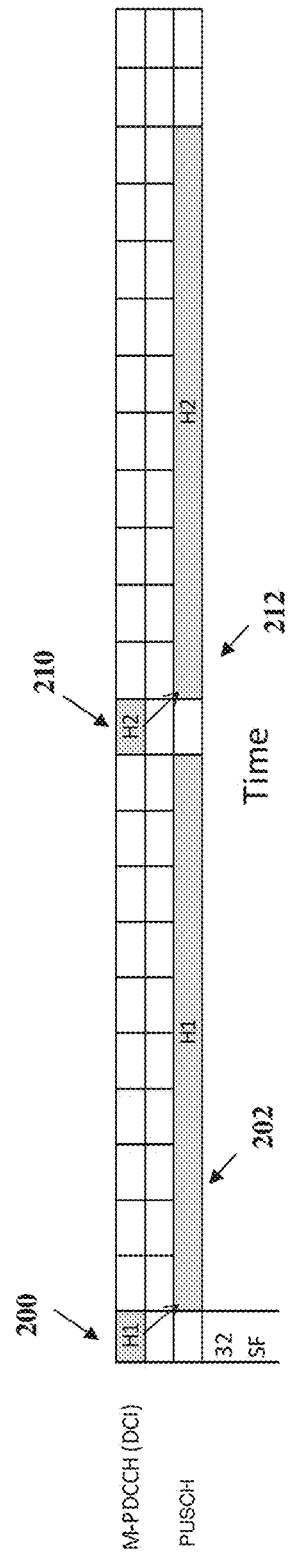

METHOD AND SYSTEM FOR TRANSMITTING CONTROL INFORMATION FOR USER EQUIPMENT

CROSS-REFERENCE TO RELATED APPLICATIONS

This application claims the benefit and priority of U.S. Provisional Application 62/232,330, filed Sep. 24, 2015. The foregoing application is incorporated by reference herein in its entirety.

FIELD OF THE INVENTION

The present invention pertains in general to wireless communication systems operating according to standards such as the Long Term Evolution (LTE), and in particular to mechanisms for transmitting control information for Category M User Equipment (UE).

BACKGROUND

The Long Term Evolution (LTE) wireless communication standard offers a high-capacity, high-speed wireless interface for use by mobile phones, data terminals, machine-type-communication (MTC) or machine-to-machine (M2M) equipment, and the like. However, in some instances it may be desirable to sacrifice aspects of an LTE terminal's performance, for example data capacity, in order to gain other benefits, such as reduced complexity and/or cost. The $3^{rd}$ Generation Partnership Project has considered such possibilities, for example in connection with "low-cost" or "limited capability" User Equipment (UE), also referred to as a CAT-M UE.

The 3GPP (Third Generation Partnership Project) standards committees have recognized the need for LTE to support very large numbers of M2M UEs and have identified objectives for modifications to the existing LTE standards designed to support very large numbers of M2M UEs. Common requirements for such modifications are that they maintain compatibility with existing devices and limit the impact of M2M traffic on the high data rate and low latency requirements of current and future users.

It has be shown that time diversity can reduce transmission time by 35% when UEs are in deep coverage holes, for example UEs that are located indoors. This has been discussed in 3GPP TSG RAN WG1 Meeting #82, Aug. $24^{th}$-$28^{th}$, 2015—R1-154489. However unless multiple Hybrid Automatic Repeat Request (HARQ) processes are supported, the UE transmission speed will be reduced. However, it is not obvious how the timing of the Downlink Control Information (DCI) for Uplink (UL) and Downlink (DL) grants can be sent and managed especially for Half-Duplex Frequency Division Duplexing (HD-FDD) UEs which cannot listen to the M-PDCCH (CAT M-Physical Downlink Control Channel) when transmitting.

It has been suggested to not use multiple HARQ processes (i.e. use only one process) in extreme coverage enhancement scenarios so the DCI timing becomes serial, for example DCI transmission followed by data transmission. The issue with this solution is that if time diversity is used the UE's data rate drops by a factor proportional to the number of HARQ processes supported. For example a UE's data rate can drop by a factor of 4 if 4 HARQ processes are supported. This drop in data rate can also negatively affect the UE's power consumption because of the amount of time required for transmission and reception.

Therefore there is a need for a method and system for transmitting control information for Category M User Equipment (UE) that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY

An object of the present invention is to provide a method and system for transmitting control information for User Equipment. In accordance with an aspect of the present invention, there is provided method for facilitating time diversity of HARQ processes in a LTE, system. The method includes transmitting one or more DCI messages indicative of multiple HARQ processes and transmitting the HARQ processes, wherein transmitting of the HARQ processes includes interleaving the HARQ processes based on the one or more DCI messages.

In accordance with an aspect of the present invention there is provided an evolved Node B, eNB, that includes a processor and machine readable memory. The machine readable memory storing machine executable instructions which when executed by the processor configure the eNB to transmit one or more downlink control information, DCI, messages indicative of multiple hybrid automatic repeat request, HARQ, processes; and transmit the HARQ processes, wherein transmission of the HARQ processes includes interleaving the HARQ processes based on the one or more DCI messages In accordance with another aspect of the present invention, there is provided a system comprising an evolved Node B (eNB) and a user equipment (UE) in a Long Term Evolution (LTE) system, the system includes an eNB HARQ time diversity module configured to determine and act up on time diversity for transmission of multiple HARQ processes and a UE HARQ time diversity module configured to receive one or more DCI messages from the eNB and determine from the one or more DCIs if time diversity has been enabled for the multiple HARQ processes.

In accordance with another aspect of the present invention, there is provided a computer program product comprising a computer readable medium storing computer executable statements and instructions thereon that, when executed by a computer, perform operations for facilitating communication between an evolved Node B (eNB) and a user equipment (UE) in a Long Term Evolution (LTE) system, the operations including transmitting one or more DCI messages indicative of multiple HARQ processes and transmitting the HARQ processes, wherein transmitting of the HARQ processes includes interleaving the HARQ processes based on the one or more DCI messages.

BRIEF DESCRIPTION OF THE FIGURES

These and other features of the invention will become more apparent in the following detailed description in which reference is made to the appended drawings.

FIG. 2 illustrates a HARQ for a legacy scenario when a UE is in normal coverage where one subframe (SF) is used to send Physical Uplink Shared Channel (PUSCH) data, in accordance with embodiments of the present invention.

FIG. 3 illustrates a transmission when 1 HARQ process is used for extreme coverage requiring 320 repeats and no HARQ interleaving is used, in accordance with embodiments of the present invention.

DETAILED DESCRIPTION

The present invention provides a method and system for transmitting control information for Category M User Equipment (UE). According to embodiments, there is provided a method and system for LTE downlink control information transmission to a UE using multiple Hybrid Automatic Repeat Request (HARQ) processes. According to embodiments, there is provided a method and system for LTE downlink control information transmission for Half-Duplex Frequency Division Duplexing (HD-FDD) UE using multiple HARQ processes in a low Signal to Interference and Noise Ratio (SINR).

It is understood that a Type I HARQ process adds both error detecting (ED) code and forward error correction (FEC) information to each message prior to transmission. When the coded data block is received, the receiver first decodes the error-correction code. If the channel quality is good enough, all transmission errors should be correctable, and the receiver can obtain the correct data block. If the channel quality is bad, and not all transmission errors can be corrected, the receiver will detect this situation using the error-detection code, then the received coded data block is rejected and a re-transmission is requested by the receiver. Furthermore it is understood that for a Type II HARQ process the message originator alternates between message bits along with error detecting parity bits and only FEC parity bits. When the first transmission is received error free, the FEC parity bits are never sent. Also, two consecutive transmissions can be combined for error correction if neither is error free.

According to embodiments, the transmission of DCI messages on the CAT M-Physical Downlink Control Channel (M-PDCCH) by the evolved NodeB (eNB) is used as an identifier to define subsequent transmission of a HARQ process which will be transmitted on the Physical Uplink Shared Channel (PUSCH) by the eNB.

Figure 1:
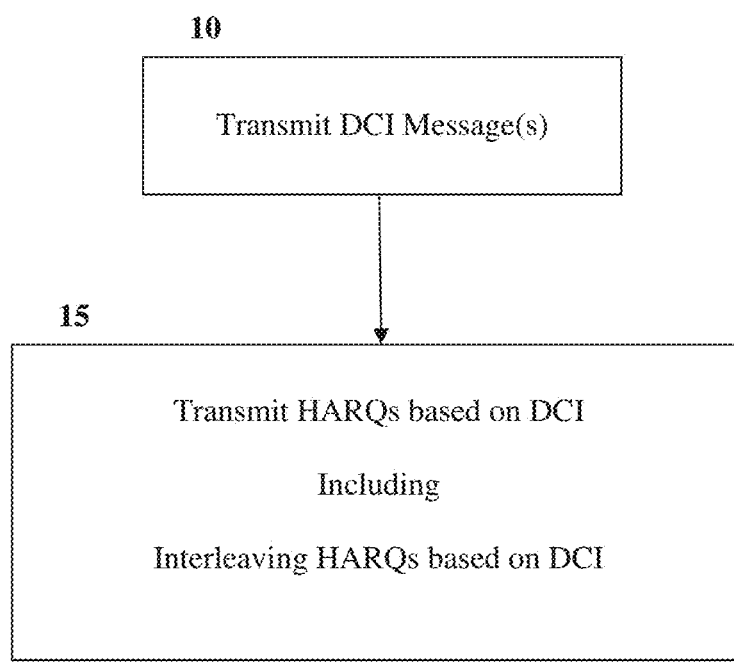
FIG. 1 illustrates a method for facilitating time diversity of HARQ process in an LTE system according to embodiments of the present invention.

According to embodiments and as illustrated in FIG. 1, one or more DCI messages are transmitted 10 by the eNB wherein the DCI message(s) is indicative of multiple HARQ processes. The eNB subsequently transmits 15 the HARQ processes, wherein transmitting of the HARQ processes includes interleaving the HARQ messages based on the one or more DCI messages.

According to embodiments, one or more DCI messages are provided to support time diversity with multiple HARQs, wherein the one or more DCI messages can be used to define the temporal transmission of the multiple HARQs. According to embodiments, one or more DCI messages can be used to define the temporal transmission of a single HARQ repeated over time.

According to embodiments, the repeated transmission of HARQ processes to a UE are interleaved over time, wherein the DCI message can provide details to the UE indicative of the manner in which the HARQ processes are interleaved. For example plural HARQ processes are transmitted sequentially initiated, while the repetition of these plural HARQ processes are interleaved. According to embodiments, the HARQ interleaving interval, for example the number of subframes required for the interval, is determined to be at least long enough for the UE to decode a DCI message. According to embodiments, for a HD-FDD UE, this interval will include the time for decoding the DCI plus the time required for the UE to switch from transmission mode (Tx) to receiving mode (Rx) and back to transmission mode.

According to embodiments, the eNB sends a DCI message to the UE at intervals during which the eNB has not assigned an Uplink (UL) message or optionally not assigned a Downlink (DL) message. According to embodiments, when the UE does not have an UL assignment in an interval, the UE can be configured to switch back to Rx and listen on the M-PDCCH for a DCI message. According to embodiments, the DCI message assigns resources which are sufficient for transmission which are equivalent to at least (HARQ#−1)*(HARQ Interleaving Interval).

FIG. 2 illustrates a HARQ for a legacy scenario when a UE is in normal coverage where one subframe is used to send Physical Uplink Shared Channel (PUSCH) data, in accordance with embodiments of the present invention. As can be seen in FIG. 2 the HARQ process is not interleaved, which is a result of the HARQ process requiring only one subframe. In this embodiment, 1 HARQ process is transmitted without time diversity. For example, the eNB transmits four DCI messages 110, 150 on the M-PDCCH, wherein these DCI messages are at least indicative of the sequence of the HARQ process 112, 152 which will subsequently be transmitted by the eNB on the PUSCH.

For the purposes of illustration, the methods illustrated in FIGS. 3 to 7, use an example where the UE is sending 1200 bits which are broken into 4 transmission blocks (TBs) of 300 bits each where each TB requires 320 repetitions and where the DCI requires 32 repetitions at an aggregation level of 24 and therefore requires 32 SF.

FIG. 3 illustrates a transmission when 1 HARQ process is used for extreme coverage requiring 320 repeats and no HARQ interleaving is used, in accordance with embodiments of the present invention. The eNB transmits a DCI message 200 on the M-PDCCH, which is indicative of the HARQ which will subsequently be transmitted on the PUSCH. The HARQ 202 is transmitted for 10 blocks, each block being equivalent to 32 subframes. Upon completion of the first transmission of a HARQ process the eNB transmits another DCI message 210 which is indicative of a second transmission of a HARQ process 212 which will be transmitted subsequently on the PUSCH. It is noted that HD-FDD switch times for the UE and ACK/NACK transmission are not illustrated in order to simplify this figure. In addition, it is noted that FIG. 3 only illustrates the first two TBs and part of the third TB, as the third TB has been cutoff early in this figure. In some embodiments, frequency hopping can be used for these transmissions, however the inclusion of this concept has not been illustrated in FIG. 3.

Figure 4:
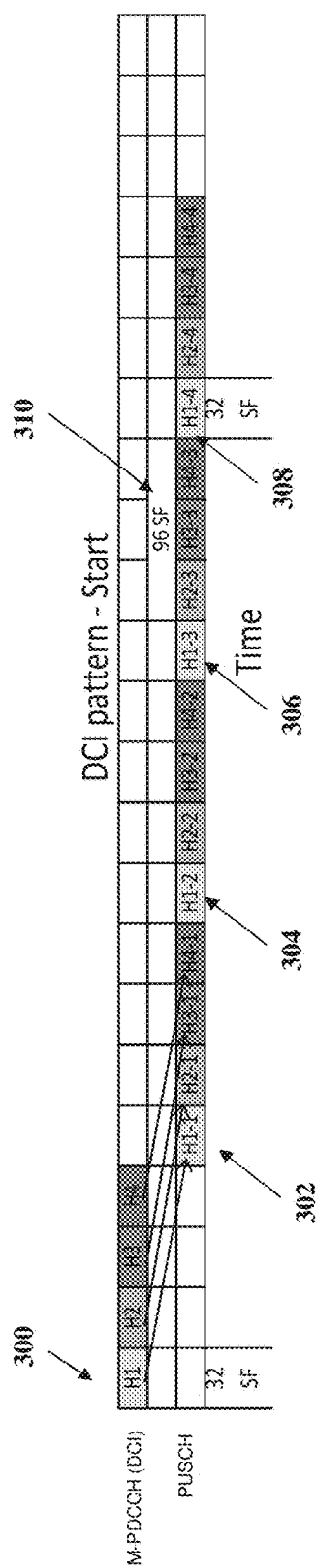
FIG. 4 illustrates a situation when 4 HARQ processes are interleaved with an interleave interval of 32 subframes (SF), in accordance with embodiments of the present invention.

FIG. 4 illustrates a situation where 4 HARQ processes are interleaved with an interleave interval of 32 subframes (SF), in accordance with some embodiments of the present invention. In the illustrated example, each square represents a HARQ interleaving interval which is 32 subframes, however it would be readily understood that greater than or less than 32 subframes may be used for this interval. According to embodiments, it is noted that as the UE is operating in HD-FDD, the length of the interleaving interval needs to be sufficient for the UE to decode a DCI message and also include sufficient time for the UE to switch from Tx to Rx and back to Tx. This switching time can typically be approximately 2 subframes (SF). It is noted that for the example illustrated in FIG. 4, each of the squares represents 32 subframes, and accordingly the time diversity duration is a total of 96 subframes (3*32) 310.

With further reference to FIG. 4, the eNB transmits DCI messages on the M-PDCCH in four sequential blocks, each block being 32 SF. These DCI messages are indicative of the sequence of transmission of the HARQ processes that will be transmitted by the eNB on the PUSCH. For example, the DCI messages 300 indicate that the HARQ processes will be transmitted in the sequence H1, H2, H3 and H4. As illustrated, the DCI messages thus convey the information to the UE that when listening to the PUSCH the HARQ processes will be received in this sequence. The first set of HARQ processes 302 are transmitted in this order followed by the second set of HARQ processes 304, third set of HARQ processes 306 and fourth set of HARQ processes 308.

According to embodiments, for the example illustrated in FIG. 4, the DCI message needs to point three HARQ interleaving intervals ahead, [(4−1)*32=96 SF] in order to allow DCI messages to be sent enabling the four HARQ processes to be interleaved, before the commencement of the assignment of the resources of the PUSCH which is used for transmission of the HARQ processes.

According to embodiments, if the TB sizes for each HARQ process are the same, the eNB may assign the same amount of UL resources for each HARQ process. In this scenario all of the HARQ processes will end at the same time and thus can also start as illustrated in FIG. 4.

However, in the instances where either the TB s are different sizes or if the Uplink data arrives asynchronously at the modem of the UE, the HARQ processes may start and end at different times. These instances can result in a more complicated transmission sequence. Examples of transmission sequences wherein HARQ processes start and end at different time are illustrated in FIGS. 5 and 6.

According to embodiments, the eNB waits for all the HARQ processes to be completed before starting any new HARQ processes, in this manner the HARQ processes will remain synchronized. In this method, all HARQ processes need to finish before one or more DCI messages can be sent and new HARQ processes can start. However this configuration can result in some SF being unused. Therefore, as some SF are left unused waiting for processes to end, the throughput to the UE can be reduced and thus latency can increase. This method is illustrated in FIG. 5.

Figure 5:
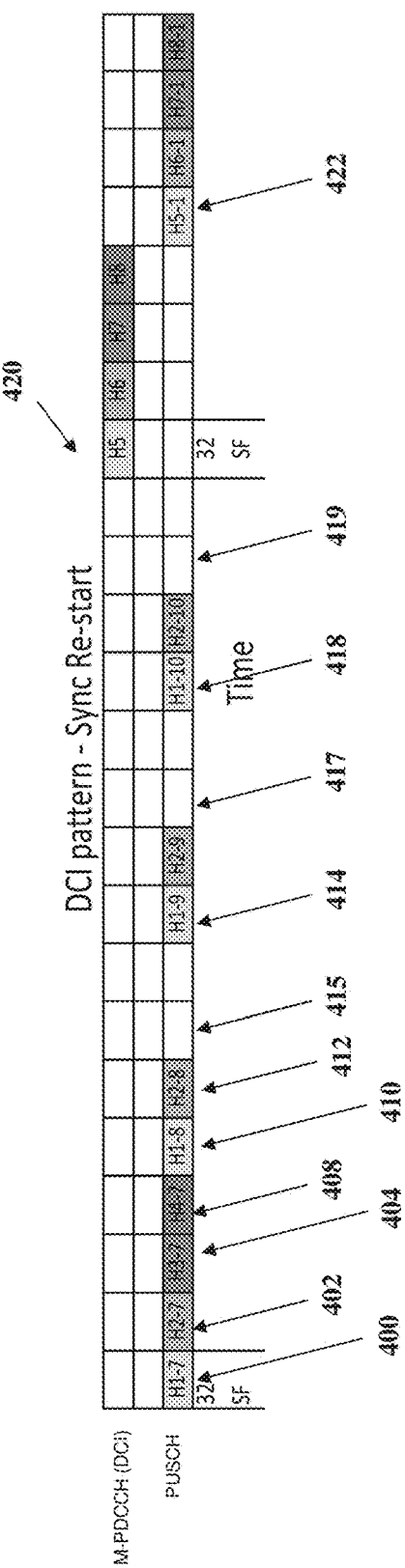
FIG. 5 illustrates a method where the evolved NodeB (eNB) waits for the all the processes to end before starting any new process, in accordance with embodiments of the present invention.
Figure 6:
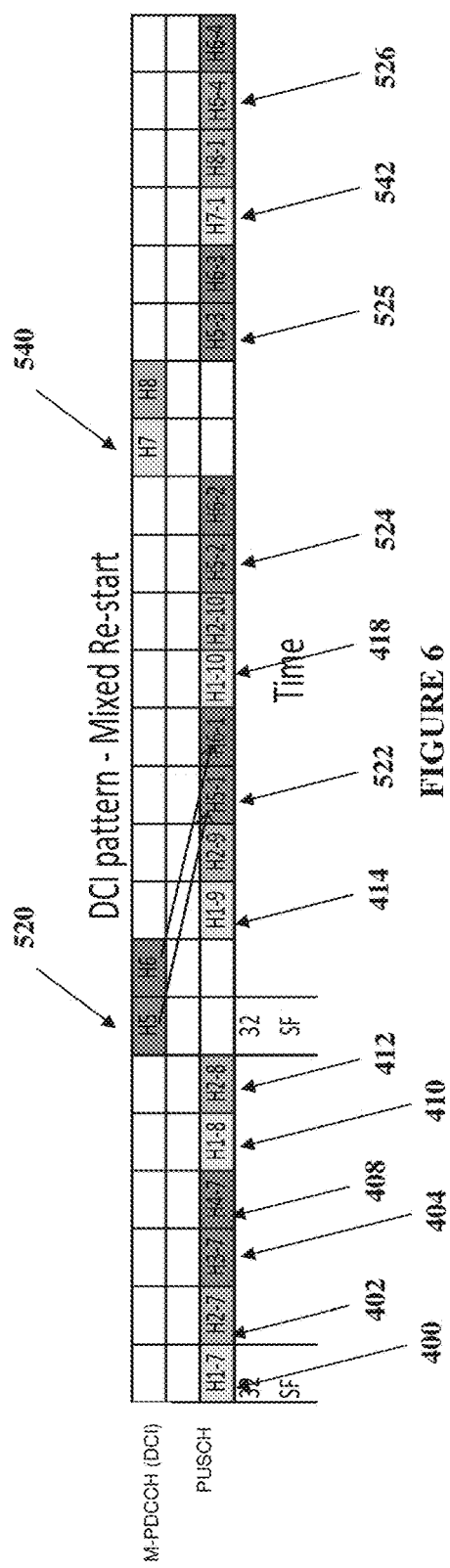
FIG. 6 illustrates a method where the eNB doesn't need to wait for HARQ processes to complete and can start new processes after other processes have finished, in accordance with embodiments of the invention.
Figure 7:
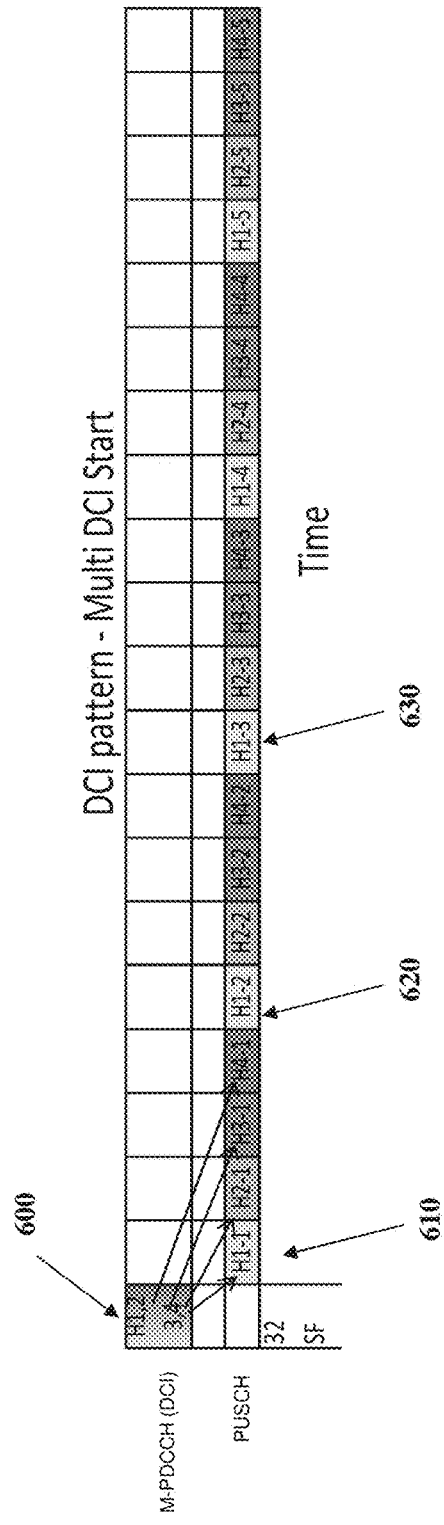
FIG. 7 illustrates a method where one DCI schedules 4 HARQ processes, in accordance with embodiments of the invention.

As illustrated in FIG. 5, HARQ processes H1 and H2 require 10 repetitions before completion, whereas HARQ processes H3 and H4 only require 7 repetitions before completion. As illustrated H1-7 400 and H2-7 402 continue through repetition 8 410, repetition 9 414 and repetition 10 418 to complete these two HARQ processes. However, HARQ processes H3 and H4 are completed upon transmission of H3-7 404 and H4-7 408. As such during the completion of transmission of HARQ processes H1 and H2, the intervening transmission blocks 415, 417 and 419 separating the repetitions of the transmission of HARQ processes H1 and H2 are unused. Upon completion of HARQ processes H1 and H2, subsequent HARQ processes are initiated by the transmission of DCI messages 420 which are indicative of the HARQ processes to be subsequently transmitted, resulting in a synchronous start of the new HARQ processes 422.

According to embodiments, the eNB does not wait for HARQ processes to complete and can start new HARQ processes after other processes have been completed resulting in a mixed start of new HARQ processes. This method is illustrated in FIG. 6.

FIG. 6 illustrates HARQ process transmission sequences that are initially the same as that illustrated in FIG. 5. As illustrated in FIG. 6, HARQ processes H1 and H2 require 10 repetitions before completion, whereas HARQ processes H3 and H4 only require 7 repetitions before completion. As illustrated H1-7 400 and H2-7 402 continue through repetition 8 410, repetition 9 414 and repetition 10 418 to complete these two HARQ processes. However, HARQ processes H3 and H4 are completed upon transmission of H3-7 404 and H4-7 408. As HARQ processes H3 and H4 are now complete, during the transmission blocks between the transmission of H2-8 412 and H1-9 414, the eNB transmits two DCI messages 520 which are indicative of new HARQ processes namely H5 and H6. As illustrated, upon the completion of the transmission of the $9^{th}$ repetition 414 of H1 and H2, the eNB transmits the first repetition of the new HARQ processes 522 which have been illustrated in FIGS. 6 as H5-1 and H6-1. In this manner, the transmission blocks that were previously left unused during the completion of HARQ processes H1 and H2 and illustrated in FIG. 5, the embodiment illustrated in FIG. 6 defines a manner in which these transmission blocks can be utilized.

With further reference to FIG. 6, upon completion of the tenth repetition 418 of HARQ processes H1 and H2 as well as the subsequent transmission of the second repetition 524 of HARQ processes H5 and H6, during the transmission blocks between the transmission of H6-2 and H5-3, the eNB transmits two DCI messages 540 which are indicative of new HARQ processes namely H7 and H8. The eNB subsequently transmits the HARQ processes on the PUSCH. As illustrated, for this example the HARQ processes transmitted are the third repetition 525 of H5 and H6 followed by the first repetition 542 of H7 and H8 followed by the fourth repetition 526 of H5 and H6. It would be readily understood that FIG. 6 does not illustrate the complete transmissions of the HARQ processes but is used to illustrate the concept of a mixed start of new HARQ processes in accordance with embodiments of the present invention.

According to embodiments, when the UE does not have any PUSCH data to transmit, it switches to Rx in order to listen to the M-PDCCH for DCI messages.

With reference to FIG. 6, it is understood that DCI message H5 and DCI message H6 need to be configured such that they can be decoded within one HARQ interleaving interval, in order for the sequencing illustrated in this figure to be suitable.

According to embodiments, individual UE resources, for example memory and processing resources, which are used for the HARQ processes, are to be suitably available for subsequent HARQ processes to commence. For example, with reference to FIG. 6, once H3 and H4 are completed, the resources used therefor can subsequently be used for the commencement of H5 and H6. Furthermore, upon completion of H1 and H2, the resources used thereby can be subsequently used for H7 and H8.

In addition, according to embodiments, for deeper coverage, for example improved indoor coverage, the interleaving interval can be longer than illustrated in the example discussed above. In some embodiments, the length of the interleaving interval can be configured to be dynamic such that the interleaving interval can be changed relative to the level of deep coverage required by the UE receiving the transmissions.

According to embodiments, in order to reduce the number of DCI messages that are transmitted, the DCI message format can be configured to contain the DCI message associated with multiple HARQ processes. This integration of multiple DCI messages into a single DCI message transmission may be suitable in the "start" scenario, for example when all of the HARQ processes are to start sequentially. For example, in FIG. 7, 4 HARQ processes are being transmitted and the DCI message transmitted can include the DCI information that is associated with all four of the HARQ processes. As illustrated, DCI message 600 includes the HARQ information for H1, H2, H3 and H4, wherein on the subsequent time block, the eNB commences the transmission of the interleaved HARQ processes, namely the first set of HARQ processes 610, the second set of HARQ processes 620, the third set of HARQ processes 630 and so on as illustrated. It would be readily understood that FIG. 7 does not illustrate the complete transmissions of the HARQ processes but is used to illustrate the concept of a single DCI message indicative of plural HARQ processes.

According to embodiments, when one DCI assigns multiple HARQ processes, the starting position of each PUSCH is based on a variable K, for example HARQ-2 commences at K from the end of the DCI message, HARQ-3 commences 2K from the end of the DCI message, and HARQ-4 commences 3K from the end of the DCI message. In the illustrated example, K has been illustrated as 32 SF, however the selection of the variable K can be dependent on the type of coverage being provided and the like as previously discussed.

It will be readily understood that while the above discussion and figures are focused on the Downlink DCI message scenario associated with HARQ, the defined methods can equally be applied to the Uplink DCI message scenario associated with the HARQ.

According to embodiments, when or if the eNB utilizes time diversity for the HARQ process can be an eNB implementation choice. In some embodiments, an eNB can initially choose to not utilize time diversity due to increased development time, however the eNB can subsequently determine that time diversity to the HARQ processes is to be used in order to reduce UE power consumption and increase PUSCH efficiency.

As would be understood by a worker skilled in the art, given the UEs will need to support 4 UL HARQ processes for the normal coverage case, there is no additional HARQ memory required to support the methods according to the instant application which can provide coverage enhancement. Accordingly, there may be no increase in UE cost to support time diversity w/multiple UL HARQ processes.

According to embodiments, supporting time diversity, for example transmission gaps, for example as illustrated in FIG. 5, can provide additional scheduling flexibility to eNBs to allow other transmissions to be scheduled in the discontinuous transmission (DTX) gaps. The number of repeats required at high coverage can be very large (e.g. 300) which can "lock" resources far into the future where network loading is still unknown. Allowing gaps in the transmission can allow the eNB some scheduling flexibility to interleave legacy traffic with the high coverage traffic.

According to embodiments, if the eNB decides to support time diversity with multiple HARQ processes, the DCI messages that are used for coverage enhancement scenarios will need to support at least Variable Forward Scheduling and Time Diversity Enabled.

According to embodiments, in Variable Forward Scheduling, the DCI message can be configured to schedule the PUSCH a variable number of SFs (or DTX intervals) in the future. To reduce DCI message bits, the resolution of forward scheduling could be DTX Intervals thus only 2 DCI message bits can be needed. The DTX Interval can be specifically specified or can be related to the number of PUSCH repeats assigned. For example DTX Interval=PUSCH repeats/10. Supporting Variable Forward Scheduling also provides additional scheduling flexibility to the eNB. Accordingly with optimization, Variable Forward Scheduling may require 2 additional bits in the DCI message.

According to embodiments, in Variable Forward Scheduling, at least 1 bit within the DCI message needs to indicate if time diversity is enabled. When time diversity is enabled, the Time Diversity Duration (i.e. the gaps between transmissions) may be fixed at 3×DTX Interval or maybe variable. If variable Time Diversity Duration is needed, 2 DCI message bits may specify values between 0 (Time diversity not enabled) and 3 (wherein 1 to 3, indicate the multiplier for the DTX Interval). Accordingly, Time Diversity configuration may require 1 or 2 DCI message bits.

Various embodiments of the present invention relate to an apparatus or system of apparatuses. An apparatus may take the form of a communication device in a wireless communication system supporting HARQ, such as an LTE wireless communication system. In some embodiments, the communication device is a wireless subscriber terminal, such as a user equipment (UE), handheld cell phone, PDA, M2M device, or the like. In some embodiments, the communication device is a base station, such as an eNB.

As will be readily understood by a worker skilled in the art, a communication device may comprise various structural elements, such as a power source, microprocessor, memory, signal processing section, radiofrequency (RF) electronics section, antenna, and the like. In various embodiments, an existing communication device, such as a UE, M2M device, eNB, or the like, which is configured to operate in a wireless communication system such as an LTE system, may be further configured to perform various operations such as transmitting DCI messages, and HARQ processes, in accordance with the present invention. Such configuration may be via new software routines loaded into memory of the device and used to guide operation thereof, or similarly via new firmware routines loaded into memory for use by appropriate components such as a microcontroller or digital signal processor. Additionally or alternatively, configuration may be performed by incorporating appropriate specialized hardware, such as electronic components, microcontrollers, logic arrays, signal processing electronics, or the like, into the device. A worker skilled in the art would understand how to adjust operation of an existing communication device or to create a new communication device having the desired operating characteristics as described herein.

Figure 8:
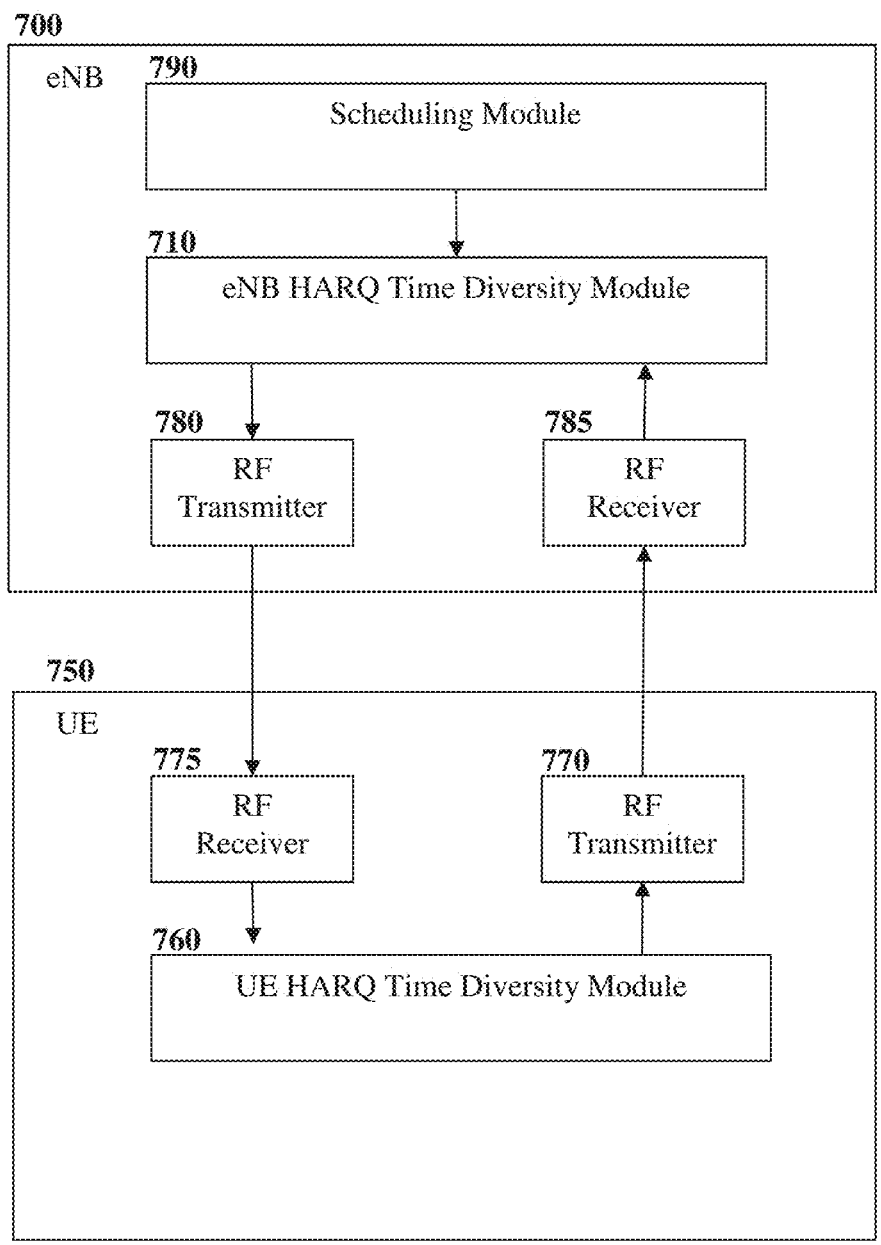
FIG. 8 illustrates a system provided in accordance with embodiments of the invention.

FIG. 8 illustrates a system comprising an Evolved Node B (eNB) 700 and a user equipment (UE) 750 in a Long Term Evolution (LTE) wireless communication system. The UE 750 comprises a UE HARQ time diversity module 760, which is configured to receive DCIs for the HARQ processes from the eNB and determine from same if time diversity has been enabled for the HARQ processes. The UE 750 further comprises various other features such as a wireless communication module, comprising a RF transmitter 770 and RF receiver 775, the wireless communication module configured to facilitate communication with the eNB via an appropriate protocol, such as LTE. Other functionalities of a UE configured to operate in accordance with a standard such as LTE would be readily understood by a worker skilled in the art.

The eNB 700 comprises an eNB HARQ time diversity module 710, which is configured to determine and act up on the use of time diversity with respect to multiple HARQ processes. The eNB 700 further comprises various other features such as a wireless communication module, comprising a RF transmitter 780 and RF receiver 785, the wireless communication module configured to facilitate communication with the UE via an appropriate protocol, such as LTE. The eNB further comprises a scheduling module 790 which is configured to perform resource assignment scheduling and re-scheduling, as would be readily understood by a worker skilled in the art. Other functionalities of an eNB configured to operate in accordance with a standard such as LTE would be readily understood by a worker skilled in the art.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A method for facilitating time diversity of hybrid automatic repeat request (HARQ) processes in a Long Term Evolution (LTE) system, the method comprising:
    transmitting, by an evolved Node B (eNB) one or more downlink control information (DCI) messages indicative of multiple HARQ processes; and
    transmitting, by the eNB, the HARQ processes, wherein transmitting of the HARQ processes includes interleaving the HARQ processes based on the one or more DCI messages, wherein the sequence of transmission of the DCI messages is indicative of the sequence of the transmission of the HARQ processes, wherein a first HARQ process completes before a second HARQ process and wherein one or more new HARQ processes are started upon completion of the second HARQ process.

2. A method for facilitating time diversity of hybrid automatic repeat request (HARQ) processes in a Long Term Evolution (LTE) system, the method comprising:
    transmitting, by an evolved Node B (eNB) one or more downlink control information (DCI) messages indicative of multiple HARQ processes; and
    transmitting, by the eNB, the HARQ processes, wherein transmitting of the HARQ processes includes interleaving the HARQ processes based on the one or more DCI messages, wherein the sequence of transmission of the DCI messages is indicative of the sequence of the transmission of the HARQ processes, wherein a first HARQ process completes before a second HARQ process and wherein a new DCI message is transmitted upon completion of the first HARQ process, the new DCI message indicative of a new HARQ process to be transmitted.

3. A method for facilitating time diversity of hybrid automatic repeat request (HARQ) processes in a Long Term Evolution (LTE) system, the method comprising:
    transmitting, by an evolved Node B (eNB) one or more downlink control information (DCI) messages indicative of multiple HARQ processes; and
    transmitting, by the eNB, the HARQ processes, wherein transmitting of the HARQ processes includes interleaving the HARQ processes based on the one or more DCI messages, wherein a single DCI message is indicative of a sequence for transmission of the HARQ processes, wherein a first HARQ process completes before a second HARQ process and wherein one or more new HARQ processes are started upon completion of the second HARQ process.

4. A method for facilitating time diversity of hybrid automatic repeat request (HARQ) processes in a Long Term Evolution (LTE) system, the method comprising:
    transmitting, by an evolved Node B (eNB) one or more downlink control information (DCI) messages indicative of multiple HARQ processes; and
    transmitting, by the eNB, the HARQ processes, wherein transmitting of the HARQ processes includes interleaving the HARQ processes based on the one or more DCI messages, wherein a single DCI message is indicative of a sequence for transmission of the HARQ processes, wherein a first HARQ process completes before a second HARQ process and wherein a new DCI message is transmitted upon completion of the first HARQ process, the new DCI message indicative of a new HARQ process to be transmitted.

5. A method for facilitating time diversity of hybrid automatic repeat request (HARQ) processes in a Long Term Evolution (LTE) system, the method comprising:
transmitting, by an evolved Node B (eNB) one or more downlink control information (DCI) messages indicative of multiple HARQ processes; and
transmitting, by the eNB, the HARQ processes, wherein transmitting of the HARQ processes includes interleaving the HARQ processes based on the one or more DCI messages, wherein the sequence of transmission of the DCI messages is indicative of the sequence of the transmission of one or more repetitions of the HARQ processes, wherein a first HARQ process completes before a second HARQ process and wherein one or more new HARQ processes are started upon completion of the second HARQ process.

6. A method for facilitating time diversity of hybrid automatic repeat request (HARQ) processes in a Long Term Evolution (LTE) system, the method comprising:
transmitting, by an evolved Node B (eNB) one or more downlink control information (DCI) messages indicative of multiple HARQ processes; and
transmitting, by the eNB, the HARQ processes, wherein transmitting of the HARQ processes includes interleaving the HARQ processes based on the one or more DCI messages, wherein the sequence of transmission of the DCI messages is indicative of the sequence of the transmission of one or more repetitions of the HARQ processes, wherein a first HARQ process completes before a second HARQ process and wherein a new DCI message is transmitted upon completion of the first HARQ process, the new DCI message indicative of a new HARQ process to be transmitted.

7. An evolved Node B (eNB) comprising:
a processor; and
machine readable memory storing machine executable instructions which when executed by the processor configure the eNB to:
transmit one or more downlink control information (DCI) messages indicative of multiple hybrid automatic repeat request (HARQ) processes; and
transmit the HARQ processes, wherein transmission of the HARQ processes includes interleaving the HARQ processes based on the one or more DCI messages, wherein the sequence of transmission of the DCI messages is indicative of the sequence of the transmission of the HARQ processes, wherein a first HARQ process completes before a second HARQ process and wherein one or more new HARQ processes are started upon completion of the second HARQ process.

8. An evolved Node B (eNB) comprising:
a processor; and
machine readable memory storing machine executable instructions which when executed by the processor configure the eNB to:
transmit one or more downlink control information (DCI) messages indicative of multiple hybrid automatic repeat request (HARQ) processes; and
transmit the HARQ processes, wherein transmission of the HARQ processes includes interleaving the HARQ processes based on the one or more DCI messages, wherein the sequence of transmission of the DCI messages is indicative of the sequence of the transmission of the HARQ processes, wherein a first HARQ process completes before a second HARQ process and wherein a new DCI message is transmitted upon completion of the first HARQ process, the new DCI message indicative of a new HARQ process to be transmitted.

9. An evolved Node B (eNB) comprising:
a processor; and
machine readable memory storing machine executable instructions which when executed by the processor configure the eNB to:
transmit one or more downlink control information (DCI) messages indicative of multiple hybrid automatic repeat request (HARQ) processes; and
transmit the HARQ processes, wherein transmission of the HARQ processes includes interleaving the HARQ processes based on the one or more DCI messages, wherein a single DCI message is indicative of a sequence for transmission of the HARQ processes, wherein a first HARQ process completes before a second HARQ process and wherein one or more new HARQ processes are started upon completion of the second HARQ process.

10. An evolved Node B (eNB) comprising:
a processor; and
machine readable memory storing machine executable instructions which when executed by the processor configure the eNB to:
transmit one or more downlink control information (DCI) messages indicative of multiple hybrid automatic repeat request (HARQ) processes; and
transmit the HARQ processes, wherein transmission of the HARQ processes includes interleaving the HARQ processes based on the one or more DCI messages, wherein a single DCI message is indicative of a sequence for transmission of the HARQ processes, wherein a first HARQ process completes before a second HARQ process and wherein a new DCI message is transmitted upon completion of the first HARQ process, the new DCI message indicative of a new HARQ process to be transmitted.

11. An evolved Node B (eNB) comprising:
a processor; and
machine readable memory storing machine executable instructions which when executed by the processor configure the eNB to:
transmit one or more downlink control information (DCI) messages indicative of multiple hybrid automatic repeat request (HARQ) processes; and
transmit the HARQ processes, wherein transmission of the HARQ processes includes interleaving the HARQ processes based on the one or more DCI messages, wherein the sequence of transmission of the DCI messages is indicative of the sequence of the transmission of one or more repetitions of the HARQ processes, wherein a first HARQ process completes before a second HARQ process and wherein one or more new HARQ processes are started upon completion of the second HARQ process.

12. An evolved Node B (eNB) comprising:
a processor; and
machine readable memory storing machine executable instructions which when executed by the processor configure the eNB to:

transmit one or more downlink control information (DCI) messages indicative of multiple hybrid automatic repeat request (HARQ) processes; and transmit the HARQ processes, wherein transmission of the HARQ processes includes interleaving the HARQ processes based on the one or more DCI messages, wherein the sequence of transmission of the DCI messages is indicative of the sequence of the transmission of one or more repetitions of the HARQ processes, wherein a first HARQ process completes before a second HARQ process and wherein a new DCI message is transmitted upon completion of the first HARQ process, the new DCI message indicative of a new HARQ process to be transmitted.

* * * * *